United States Patent Office 3,595,755
Patented July 27, 1971

3,595,755
DETECTION OF HYDROGEN PEROXIDE
Arnold Härtel, Darmstadt, Germany, assignor to
E. Merck A.G., Darmstadt, Germany
No Drawing. Filed Mar. 11, 1968, Ser. No. 711,911
Claims priority, application Germany, Mar. 10, 1967,
M 73,125; May 9, 1967, M 3,909
Int. Cl. C09k 3/00; C012k 1/00; G01n 31/14
U.S. Cl. 195—103.5                        19 Claims

ABSTRACT OF THE DISCLOSURE

Water-soluble vanadates are redox catalysts in compositions (containing a water-soluble iodide) for the detection of small quantities of hydrogen peroxide. Said detection is useful in the diagnosis of diabetes mellitus, the control of insulin therapy and the determination of other metabolic imbalances.

BACKGROUND OF THE INVENTION

Field of the invention

This invention relates to a novel analytical system for determining the presence of hydrogen peroxide.

The detection and the quantitative determination of hydrogen peroxide and compounds yielding hydrogen peroxide has recently gained importance in many fields of application, for example, in the quantitative analysis of peroxide catalysts in polymerization media or of perhydrol solutions. Of particular importance is the detection of hydrogen peroxide produced from enzymatic substrates, e.g. glucose and galactose, by the activity of enzymes, e.g. glucose oxidase and galactose oxidase, respectively, in the presence of oxygen. The content of the enzyme substrate (glucose or galactose) is determinable from the amount of hydrogen peroxide detected. An exact glucose determination is particularly important in the examination of body fluids, e.g. blood and plasma, and urine in clinical laboratories. The determination serves primarily in the diagnosis of diabetes mellitus and for the control of insulin therapy. Additionally, an anomalous blood sugar content provides an indication of a number of other metabolic imbalances. In the same manner, the detection of galactose is useful for liver function tests and for the diagnosis of galactosemia.

The detection of small amounts of hydrogen peroxide is particularly difficult, especially when they are formed, for example, by the effect of enzymes, such as glucose oxidase or galactose oxidase, upon a corresponding enzymatic substrate, i.e. glucose and galactose, respectively, in the presence of oxygen, since reactions with the customary analytical hydrogen peroxide reagents in such cases proceed too slowly.

Sometimes, it is possible to accelerate catalytically the detection reaction, which actually takes place very slowly, by the addition of suitable compounds. Iodide-containing catalyst mixtures are of particular interest since they are of excellent stability.

(2) Prior art

The formation of hydrogen peroxide from glucose, oxygen and glucose oxidase in the presence of an iodide is accelerated by the addition thereto of a molybdate as catalyst. The thus-formed hydrogen peroxide, representing a measure of the basic glucose concentration, is detected by the discoloration of a chromogen oxidizable by hydrogen peroxide, iodide, and molybdate (French Pat. 1,256,933). This conventional process is however, best with disadvantages: (a) during the colorimetric evaluation of the chromogen oxidized by the hydrogen peroxide, only relatively minor maximum yields in color are obtained; (b) a relatively high concentration of the catalyst is required for attaining the maximum color yield; and (c) the relatively large amount of molybdate necessary requires a long dissolution time.

SUMMARY OF THE INVENTION

An agent for the detection of small quantities of hydrogen peroxide is a composition containing a water-soluble vanadate as a redox catalyst and a water-soluble iodide. Optional additional constituents of the agent are: (a) a polymer having a protective colloid effect, (b) a buffer and (c) an indicating agent for hydrogen peroxide and/or iodide. Said agent is used for the quantitative analysis of hydrogen peroxide in a given medium and also for the detection and quantitative analysis of hydrogen peroxide liberated by the action of a reagent on an aqueous substrate. Analytical determinations of small amounts of hydrogen peroxide and of compounds evolving hydrogen peroxide when acted upon by a reagent in aqueous media have many applications. For these applications, sensitivity, ease of handling and accuracy are important considerations.

It is an object of this invention to produce an agent for the detection and quantitative analysis of hydrogen peroxide. It is a further object that the agent be one which is easily handled. The agent must also have a long shelf life, i.e. be storage-stable. An additional object is to obtain an agent which yields very accurate results in quantitative determinations of hydrogen peroxide present in a particular medium. Moreover, it is important that the optimum amount of catalyst dissolve in a very short period of time for the rapid preparation of solutions ready for use in the detection of hydrogen peroxide. These and further objects, apparent from the instant description, are attained by the use of said agent.

In the conventional method for the evaluation of the amount of hydrogen peroxide present (by colorimetric analysis of a chromogen oxidized by the hydrogen peroxide to be detected) a maximum color yield for the chromogen is obtained with a concentration of only 0.04–0.05 percent by weight per volume analytical solution of redox catalyst in the analytical solution when said catalyst is a water-soluble vanadate. When a molybdate is employed as the redox catalyst (French Pat. No. 1,256,933), the maximum color yield, obtained only with from 20–25 times the catalyst concentration (about 1 percent), is from 75–80 percent that obtained with the vanadate.

Previously known redox catalysts for hydrogen peroxide detection, e.g. peroxidase and compounds exhibiting peroxidase activity, likewise have disadvantages; these stem, for example, from their dependence upon vegetable raw material which is difficult to purify and exhibits poor preservability.

DETAILED DISCUSSION OF THE INVENTION

The agent for the detection of small quantities of hydrogen peroxide (or materials yielding hydrogen peroxide when acted upon by a reagent in aqueous media) comprises the following aqueous composition:

TABLE

Composition of the agent

| Ingredient | General, g. mols/liter | Preferred, g. mols/liter |
|---|---|---|
| Water-soluble Vanadate (redox catalyst).. | 0.0003–0.2 | 0.001–0.1 |
| Water-soluble iodide | 0.006–1 | 0.01–0.1 |
| Buffer | 0–0.8 | 0.05–0.2 |
| Chromogen | 0–0.0005 | 0.00008–0.0015 |
| Polymeric protective colloid [1] | 0–0.15 | 0.002–0.1 |

[1] Values are in percent by weight of the total aqueous composition.

Dry compositions, e.g. in powder form, have the same relative proportions, except for the absence of water.

During the reaction of hydrogen peroxide (or a compound yielding hydrogen peroxide) with the iodide under the catalytic influence of the vanadate, compounds are produced which are detected in a conventional manner with the aid of an iodine and/or a hydrogen peroxide reagent. The oxidation products which are formed as intermediates in the analytical solution when conducting the analysis are not known with certainty. The hydrogen peroxide to be measured under the catalytic influence of the vanadates may first oxidize all of the iodide to iodine. The thus-produced iodine can then react with other compounds, e.g. an oxidizable chromogen, contained in the analytical solution in a secondary reaction.

The redox catalyst is one or more water-soluble vanadates, particularly alkali vanadates, such as sodium, potassium and/or ammonium vanadates. The valence state of the vanadium in the vanadates, used as catalyst, is 5. The only function of the cation, e.g., the alkali metal cation, is to make the vanadate anion water-soluble. Vanadates which comply with this requirement, may be used as a catalyst in the agent according to this invention. Especially suited are the colorless, low-molecular (essentially monomeric to tetrameric) vanadates, preferably the corresponding o-, m-, or pyro-vanadates, The o-vanadates afford the advantage that they dissolve very quickly and do not form any undesired polyvanadates, even in a temporarily acidic medium.

If the sample to be measured is neutral, ammonium-m-vanadate is very well suited as the catalyst, since it is readily available in the pure form and is not hygroscopic. Preferably, the vanadates are employed in 0.0003–0.2 molar, particularly 0.001–0.1 molar concentrations.

Preferred water-soluble iodides are alkali iodides, particularly sodium, potassium and/or ammonium iodide. Potassium iodide is especially suitable, since it is not hygroscopic. The iodides are preferably employed in concentrations of 0.006–1 molar, particularly 0.01–0.1 molar concentrations.

If desired, the agent of the invention can also contain a buffer, e.g. mixtures of alkaline- and acidic-reacting compounds having a buffering effect, to maintain the agent or the solution thereof in a suitable pH range. The use of the buffers is particularly applicable when detecting hydrogen peroxide formed from enzymes and enzymatic substrates in the presence of oxygen. In this case, buffering agents are employed which maintain the agent or the solution thereof in a pH range of from about 4.5 to 9.5, preferably between 6.5 and 8.5. A phosphate buffer (primary and secondary alkali phosphate, particularly sodium or potassium phosphate) can be employed. Another very suitable buffer is tris(hydroxymethyl)aminomethane. Further illustrative buffers that can be employed are sodium bicarbonate, triethanolamine and alkali barbiturates such as sodium barbiturate. Many others can, of course, be selected from handbooks, etc. The buffer is employed, in general, in up to 0.8 molar, preferably about 0.05–0.2 molar concentrations.

The hydrogen peroxide, or the iodine formed from the iodides under the effect of the hydrogen peroxide, can be detected in a conventional manner such as by titration with sodium thiosulfate with the use of starch (amylose) as the indicator, or, in case of low concentrations, potentiometrically, as described, for instance, in "Analytical Chemistry," 33, p. 1040 (1961). However, for routine purposes, particularly in case of very low concentrations, the reaction with a chromogen is most suitable since the thus-produced colored substance can be readily measured colorimetrically in a conventional manner. (See, in this connection, Snell and Snell: "Colorimetric Methods of Analysis," Vol. I, page 567, Capman and Hall Publishers, London, 1936.) The reagent employed for detecting hydrogen peroxide or iodine, in particular the chromogen, can be initially present in the agent. In such an embodiment the hydrogen peroxide or iodine (present or evolved) is used up in situ.

Preferred chromogens oxidizable [by means of hydrogen peroxide ($H_2O_2$) or by produced iodine] to a colored compound are, in particular, aromatic amines and phenols, such as dianisidine, tolidine, anisidine, p-toluidine, o-phenylenediamine, benzidine, 2,7-diaminofluorene, o-toluidine, $\alpha$-naphthol and guaiacol. The chromogens are suitably employed in the form of salts thereof, e.g. acid addition salts, such as hydrohalides, particularly hydrochlorides and hydrobromides. Especially suitable is o-dianisidine or hydrochloride or hydrobromide, and in particular, the bis-dihydrogen phosphate, since these salts, after being dissolved in water, result in an acidic, relatively stable solution. The chromogen is preferably employed in concentrations of 0–5, particularly 0.08–1.5 millimol per liter.

The agent may additionally contain natural or synthetic inert, water-soluble polymers having a protective colloid effect. The protective colloids prevent the undesired flocculation of compounds contained in the solution being analyzed, particularly pigments which may have been formed form the chromogen. The addition of a protective colloid thus is particularly recommended when measuring higher $H_2O_2$ concentrations.

Inert water-soluble polymers which exhibit a favorable protective colloid effect when conventionally tested as described, for example, in "Praktikum der Kolloidchemie" (Practical Course of Colloid Chemistry) by Thiele, Steinkopff Publishers, Frankfurt am Main, 1950, pp. 40/41, and which do not react markedly basically or acidically in an aqueous solution are particularly suitable. The so-called "gold number" of the polymer can be employed as a yardstick for the protective colloid activity. Preferred protective colloids for the agent are those inert water-soluble polymers having a gold number of the magnitude of 0,005 or smaller. Illustrative of these protective colloids are polyethylene glycol and gelatin, the preferred polymer being polyvinylpyrrolidone. Especially polyvinylpyrrolidone with an average molecular weight of about 10,000–40,000 and which shows in a 5% aqueous solution at 25° C. a viscosity of 1.2–40 cp. can be employed to advantage.

Other inert water-soluble vinyl polymers, such as polyvinyl alcohol, also have a satisfactory protective colloid effect. Polymers having a high gold number ranging, for example, in the order of magnitude of 0.25 (gold number of starch (amylum)) are unsuitable as protective colloids.

A special advantage to employing a protective colloid, for example, polyvinylpyrrolidone, in the agent is that the calibration curves relating to the quantum of hydrogen peroxide detected extend linearly and can be readily reproduced. If no protective colloid is present, turbidity occurs; both calibration and reproducibility are thus rendered more difficult.

The protective colloid is preferably added in a concentration of 0.002–0.1% by weight, based on the total weight of the aqueous agent. For polyvinylpyrrolidone, a range of concentration of about 0.003–0.05% by weight (based on the solution ready for use) is particularly advantageous. In certain cases, the polymer employed as protective colloid must be freed of oxidizing or reducing admixtures before being incorporated into the agent. For example, when using polyvinylpyrrolidone, any peroxides contained in the polymer must first be removed in order to attain low blank values for the hydrogen peroxide measurement. This can be done, e.g. by treating the polyvinylpyrrolidone with a reducing agent, such as zinc/hydrochloric acid in an aqueous medium and zinc amalgam in a dichloromethane solution, or by treatment with catalase and subsequent boiling of the resulting aqueous solution.

In addition to determining hydrogen peroxide per se, the agent serves to detect, for example, peroxy compounds, such as ethyl peroxide and peroxy disulfate, or other materials yielding hydrogen peroxide. In the determination of compounds yielding hydrogen peroxide, it is often advantageous to add to the agent a reagent which liberates hydrogen peroxide by reaction with such compounds. The presence of a reagent liberating hydrogen peroxide thus makes it possible with the agent of this invention to detect, in addition to hydrogen peroxide and peroxy compounds, other compounds which do not contain any peroxy groups but which can be made to react with the reagent to yield hydrogen peroxide. Reagents liberating hydrogen peroxide include substances which react with the compound to be detected, optionally in the presence of oxygen to form hydrogen peroxide.

In a particularly preferred embodiment, the agent is used for the purpose of measuring hydrogen peroxide formed in the presence of oxygen from enzymes and enzyme substrates under the effect of water-soluble iodide and vanadate. From the measured amount of hydrogen peroxide, the basic content of enzyme or enzymatic substrate is calculated.

Accordingly, the agent makes possible the detection and quantitative analysis of enzymatic substrates which form hydrogen peroxide with enzymes in the presence of oxygen. For purposes of such an analysis, the agent contains, as a reagent for liberating hydrogen peroxide, an excess (based on the amount of enzyme substrate to be detected) of an enzyme which, as is known, forms hydrogen peroxide with the enzyme substrate in the presence of oxygen, preferably atmospheric oxygen.

If an enzyme which forms hydrogen peroxide with an enzyme substrate is to be detected with the agent, it contains, as a reagent for liberating hydrogen peroxide, an excess (based on the amount of the enzyme to be detected) of the substrate.

The following oxidases (and the corresponding substrates) are exemplary of those measured by means of the agent:

| Substrate: | Oxidase |
| --- | --- |
| Glucose | Glucose oxidase. |
| Galactose | Galactose oxidase. |
| L-amino acid | L-amino acid oxidase. |
| D-amino acid | D-amino acid oxidase. |
| Diamine | Diamine oxidase. |
| Hexose | Hexose oxidase. |
| Monoamine | Monoamine oxidase. |
| Glycollate | Glycollate oxidase. |
| Oxalate | Oxalate oxidase. |
| Aldehyde | Aldehyde oxidase. |
| Pyridoxamine | Pyridoxamine oxidase. | the agent; when the presence and/or quantity of oxidase is to be determined, the corresponding substrate is incorporated in the agent. In addition to the basic substrate (or oxidase, as the case may be) incorporated in the agent, oxygen, preferably atmospheric oxygen, is generally also incorporated in the agent for these determinations. The determination of glucose or glucose oxidase and that of galactose or galactose oxidase proceed particularly favorably when a water-soluble vanadate and iodide are combined in the agent.

For the detection of glucose and galactose, the agent contains, as the reagent liberating hydrogen peroxide, an excess (in each case based on the approximate amount of glucose or galactose present) of glucose oxidase and galactose oxidase, respectively.

For this purpose, as well as the analysis of other enzyme substrates, an agent in the form of a powder is advantageously employed. The composition of the powder is such that, upon solution in a suitable volume of water, it will provide the following components in the indicated concentrations:

Water-soluble vanadate (e.g. $NH_4VO_3$ or $Na_3VO_4 \cdot 10 H_2O$)—0.0005–0.1 g. mol/l.
Water-soluble iodide (e.g. potassium iodide)—0.006–0.3 g. mol/l.
Buffer, resulting in a pH of 4.5–9.5 (e.g. a combination of $K_2HPO_4$ and $K_2HPO_4$)—0.002–0.8 g. mol/l.
Tris(hydroxymethyl)aminomethane—0–0.5 g. mol/l.
Chromogen (e.g. dianisidine bis-dihydrogen phosphate)—0.01–1 g. mmol/l.
Enzyme (e.g. glucose oxidase or galactose oxidase) (5–50 u./mg.)—0.01–10 g./l.
Protective colloid (e.g. polyvinylpyrrolidone)—0.03–1 g./l.

When determining glucose oxidase and galactose oxidase, the agent of this invention contains, as the reagent liberating hydrogen peroxide, an excess (based on the amount of the glucose oxidase or galactose oxidase present) of glucose and galactose, respectively. The amount of hydrogen peroxide measured per unit of time is a measure for the amount of glucose oxidase and galactose oxidase present in each instance. It is preferred in some cases, for example, when determining very small quantities of glucose oxidase, to saturate the analytical solution with pure oxygen. The sensitivity of the measuring method is thus increased. However, it is generally sufficient to operate in the presence of atmospheric oxygen, which can be done particularly simply and with readily reproducible results.

A chromogen is advantageously employed when analyzing enzyme substrates or enzymes for the purpose of detecting hydrogen peroxide or iodine. Previously enumerated chromogens, particularly o-dianisidine, tolidine or benzidine, are exemplary.

In analyses of enzyme substrates or enzymes, there is formed, in addition to hydrogen peroxide, for example, from glucose/glucose oxidase or galactose/galactose oxidase, in the presence of oxygen and iodide, gluconic acid or hexose dialdehyde, by the homogeneous catalysis under the effect of the vanadate. The hydrogen peroxide then reacts with the chromogen, under the influence of the iodide and the vanadate present, to form a colored compound, which latter can subsequently be analyzed colorimetrically. A buffer, for example, primary and/or secondary alkali phosphate and/or tris(hydroxymethyl)aminomethane, is preferably employed in this mode of operation.

When identifying enzymatic substrates or enzymes by means of the agent, a first solution containing the iodide, the vanadate and, optionally, the buffer is suitably prepared; the pH of this solution is adjusted, if necessary, to a neutral value, by the addition of an acid or a base or an acid or a basic salt. Suitable are inorganic acids, e.g. hydrogen halides, such as hydrochloric or hydrobromic acid, sulfuric acid, perchloric acid or phosphoric acids, or organic acids, e.g. carbonic acids, especially lower carbonic acids, such as acetic acid, oxalic acid, substituted carbonic acids, e.g. halogeno carbonic acid, such as chloro acetic acid, glycolic acid, citric acid, or sulfonic acids such as benzene or toluene sulfonic acid, or acid inorganic or organic salts, e.g. primary alkali phosphates such as primary sodium or potassium phosphate; illustrative bases include inorganic hydroxides, e.g. alkali hydroxides such as sodium or potassium hydroxide, organic bases, especially amines as pyridine, or basic salts as sodium bicarbonate. To this solution is added an excess of the enzyme or enzyme substrate. In addition thereto, a second and separate solution containing a chromogen salt is produced. If desired, the acidic components of the buffer can also be introduced into the second solution together with the chromogen salt. By combining the two thus-prepared solutions, the agent, ready for use, is obtained. It is also possible to remove the water from each of the two solutions, or from a mixture of both solutions, by freeze-drying. The dry preparation obtained in this manner is redissolved in water before use.

The agent can alternatively be prepared by dry-mixing the components in the solid phase, e.g. in the form of a powder, in order to increase the shelf life. In this connection, the vanadate should be mixed only loosely with a hygroscopic or water-containing acidic substances, such as potassium dihydrogen phosphate, contained in the agent. Any intense intermixing, for example, by triturating these components, may lead to the formation of undesired polyvanadates. It is also possible to employ a first dry mixture of water-soluble iodide, water-soluble vanadate and, optionally, a buffer, the reagent liberating hydrogen peroxide, and protective colloid and a second mixture consisting of a chromogen salt, optionally used as detecting reagent for hydrogen peroxide or iodine. By dissolving the powdery reagent, for example, the two afore-mentioned powder mixtures, in water, a solution is obtained which is ready for use.

An agent particularly suitable for glucose detection is obtained by dissolving in 100 parts by weight of water a dry mixture of about 0.040 part by weight of water-soluble vanadate, preferably sodium o-vanadate hydrate or ammonium m-vanadate, about 0.400 part by weight of potassium or sodium iodide, approximately 0.892 part by weight of secondary potassium phosphate, about 0.945 part by weight of primary potassium phosphate, about 0.200 part by weight of tris(hydroxymethyl)aminomethane, about 0.020 part by weight of glucose oxidase and about 0.015 part by weight of polyvinylpyrrolidone to form a first solution; dissolving in 1 part by weight of water about 0.010 part by weight of dianisidine-bis-dihydrogen phosphate to form a second solution; and combining the two solutions for the analytical determination.

In order to detect hydrogen peroxide liberated, for example, from glucose or from galactose by enzymatic oxidation, it is advantageous to employ a ready-for-use aqueous solution of the agent having the following concentrations:

Vanadate—Approximately 0.0003–0.1, preferably 0.001–0.1 mol/liter;
Iodide—About 0.006–1, preferably 0.02–0.1 mol/liter;
Buffer, particularly phosphate buffer (e.g. secondary and primary potassium phosphate)—About 0.02–0.8, preferably 0.05–0.2 mol/liter;
Optional additive tris(hydroxymethyl)aminomethane— Up to about 0.5, preferably 0.03–0.1 mol/liter;
Protective colloid, especially polyvinylpyrrolidone—Approximately 0.003–0.1% by weight;
Optional chromogen, particularly o-dianisidine—About 0.01–1, preferably 0.08–0.5 millimol/liter;
Amount of enzyme added, e.g. glucose oxidase or galactose oxidase—0.1–300 u./ml., preferably 5–20 u./ml.

Higher concentrations (about 0.01–0.1 mol/liter of water-soluble vanadate, about 0.1–0.3 mol/liter of iodide, optionally about 0.01–0.1 millimol/liter of chromogen, optionally about 0.2–0.8 mol/liter of buffer, optionally about 20–300 u./ml. of enzyme) are employed when the agent is utilized in the form of a sprayable solution. (In this connection, "u." means the ordinarily employed units, i.e. the amount of enzyme which reacts with $10^{-6}$ g. mol of the substrate per minute.)

If an enzyme, e.g. glucose oxidase and galactose oxidase, is to be detected in place of an enzymatic substrate, the enzyme in the agent composition is replaced by a suitable enzyme substrate, e.g. glucose and galactose, respectively, in a concentration of 0.1–10%, preferably 1–5%, by weight per volume analytical solution.

The subject detection process is employed for the determination of hydrogen peroxide or compounds yielding hydrogen peroxide in small concentrations (generally $10^{-5}$ to $10^{-10}$, preferably about $10^{-7}$ to $10^{-9}$ mol/analytical batch). Concentrated solutions are suitably appropriately diluted before the detection procedure. The agent of this invention can be utilized in solution (in certain cases also as a sprayable solution) for the detection of substances separated by layer chromatography and yielding hydrogen peroxide, particularly enzyme substrates, or in a suitable solid form, e.g. as a powder, tablet, or as a test paper impregnation.

The process for the analytical determination of hydrogen peroxide or compounds yielding hydrogen peroxide in accordance with this invention is suitably conducted by adding a small sample of the solution to be analyzed to an excess of the agent of the invention, and, after termination of the reaction, for example, after 10 minutes, measuring the thus-formed hydrogen peroxide or iodine by means of one of the conventional methods for the detection of hydrogen peroxide or iodine. If a colorimetrical iodine determination method is employed, the chromogen can be incorporated initially in the reactant solution.

When enzymatic activity is to be determined, the amount of hydrogen peroxide or iodine formed is measured in dependence upon time, suitably at standard temperatures, e.g. at 25° C. 30° C., or 37° C. The enzyme concentration is proportional to the reaction velocity determined by measuring same at two or more points in time. In general, the conversion of the substrate in $\mu$mol per minute is a measure of enzyme concentration.

For analyzing a substrate, the amount of hydrogen peroxide or iodine evolved after a predetermined incubation period (when employing a chromogen), preferably at the instant of maximum color yield, e.g. after 30 minutes, is advantageously measured, preferably by extinction measurement. Here, too, the process is suitably conducted at a standard temperature, preferably at room temperature (20° C.).

When determining enzyme substrates in strongly protein-containing solutions, e.g. in serum, blood or plasma, it is advantageous in many cases to remove the protein from the solution first. Conventional deproteinization methods, particularly with uranyl acetate, trichloroacetic acid or perchloric acid, are suitable for this purpose.

The content of substrate, for example, glucose or galactose in the serum, is measured by means of a solution ready for use in a conventional manner, for example, similarly to the description in H. U. Bergmeyer: "Methoden der Enzymatischen Analyse" (Methods of Enzymatic Analysis), Chemie Publishers, Weinhein/Bergstrasse (1962), page 123. A measured quantity (for example, 0.1 or 0.2 ml.) of the sample (e.g. deproteinized serum) to be analyzed, diluted 1:10, is suitably added to an excess (e.g. 2 or 5 ml.) of reagent; the resulting mixture is then allowed to stand until the maximum color yield is obtained (for example, ½ hour) at a fixed convenient temperature (e.g. at room temperature); and the extinction is measured at a wavelength in the range of 420–500 m$\mu$ by means of a photometer, the unreacted reagent solution serving as the blank for this determination. By comparison with the corresponding values of a standard solution, the substrate content (for example, the galactose content) to be determined is obtained.

Without further elaboration, it is believed that one skileld in the art can, using the preceding description, utilize the present invention to its fullest extent. The following preferred specific embodiments are, therefore, to be construed as merely illustrative, and not limitative, of the remainder of the specification and claims in any way whatsoever.

All solutions are aqueous solutions and all percentages are by weight of total solution unless otherwise specified.

EXAMPLE 1

(a) Agent for the detection of hydrogen peroxide

To an aqueous (aq.) solution [40 milligrams (mg.) of potassium iodide and 5 mg. of $NH_4VO_3$ dissolved in 5 milliliters (ml.) of water] is added 0.05 ml. of a 0.5 percent (aq.) solution of dianisidine dihydrochloride.

Replacing the 0.5 percent (aq.) solution of dianisidine dihydrochloride with 0.05 ml. of a 0.4 percent methanolic dianisidine solution results in an alternative embodiment.

The 5 ml. of water are replaced by 5 ml. of 0.1 molar (aq.) phosphate buffer solution (pH=7) when the $H_2O_2$-containing solution to be analyzed is strongly acidic or strongly basic.

Replacing the $NH_4VO_3$ with 5 mg. of $Na_3VO_4$ hydrate and/or replacing the chromogen (dianisidine dihydrochloride) with 0.05 ml. of a 0.5 percent (aq.) solution of dianisidine bis-dihydrogen phosphate results in further exemplifications of the agent for the detection of hydrogen peroxide.

(b) Conducting hydrogen peroxide determination

An admixture of the solution described under (a) with 0.05 ml. of the sample to be examined (the hydrogen peroxide content of this sample ranging between about 0.0003 and 0.006%) is allowed to stand for 10 minutes at room temperature. [If the sample has an $H_2O_2$ concentration higher than the noted range, it is diluted to a content on the order of magnitude of 0.002%.] Depending upon the concentration, the solution turns light brown to dark brown. Thereafter, the extinction of the solution is measured at 436 m$\mu$ in a photometer with a mercury-cadmium lamp in a 2-centimeter (cm.) cuvette, with respect to a blank value. The content of hydrogen peroxide in the solution to be examined is obtained by comparison with the extinction of a standard sample.

EXAMPLE 2

Determination of peroxydisulfate

A peroxydisulfate solution (pH=7.0) is diluted to a concentration of from 0.01 percent to 0.1 percent of peroxydisulfate. The agent of Example 1(a) is admixed with 0.05 ml. of the thus-diluted peroxydisulfate solution, and the resultant solution is allowed to stand at room temperature for thirty minutes. The extinction of the solution is then measured and the concentration of peroxydisulfate determined in a manner analogous to that described in Example 1(b).

Replacing the peroxydisulfate solution with an alkyl peroxide, e.g. ethyl peroxide solution, the concentration of alkyl peroxide is determined in the same manner.

EXAMPLE 3

(a) Agent for the detection of glucose oxidase on the basis of the hydrogen peroxide formed therefrom with glucose oxygen The glucose is supplied in an excess in the analytical solution. The amount of hydrogen peroxide detected (in a sample having an unknown content of glucose oxidase) is a measure of the quantity of glucose oxidase.

Solution A.—In 100 ml. 0.1 molar (aq.) phosphate buffer (pH=7.0), 400 mg. of potassium iodide and 100 mg. of sodium m-vanadate are dissolved. Subsequently, the solution is saturated with oxygen or air at an adequate temperature, e.g. at 0° C. or preferably at a fixed temperature of 15–30° C., e.g. at 25° C.

Solution B.—0.025 ml. of a 1% (aq.) solution of dianisidine bis-dihydrogen phosphate and 0.5 ml. of a 10% (aq.) solution of glucose are combined.

(b) Conducting the determination 2.5 ml. of solution A are introduced into the cuvette of a photometer. Thereafter, 0.05 ml. of a solution ($x$) containing glucose oxidase in a concentration of 1–10 u./ml., but the exact content of which is unknown, is introduced into the cuvette together with 0.45 ml. of the solution B. The combined solutions are mixed.

Thereupon, the mixture is allowed to stand until the extinction at 436 m$\mu$ has increased by about 0.05, and the time required for a further increase in extinction of 0.1 is clocked.

The thus-measured time ($t$) is inversely proportional to the amount of hydrogen peroxide formed per time unit and thus also to the glucose oxidase activity.

In order to set forth units (u.= millimols of glucose per minute; dependent on the degree of oxygen saturation of the solution), a calibrating value is measured after an excess of glucose oxidase was made to be effective on a small amount of glucose. For this purpose, 50 mg. of glucose oxidase (30 u./mg.), for example, is dissolved in 100 ml. of solution A, and 5.75 ml. of this solution are mixed with 0.05 ml. of a 1% solution of dianisidine bis-dihydrogen phosphate and 0.2 ml. of a 0.01% solution of glucose in water. The mixture is allowed to stand for ½ hour, and the extinction $E_s$ is measured at 436 m$\mu$ with respect to a blank value. The extinction $E_s$ is inserted in the following formula for calculating the glucose oxidase activity.

Glucose oxidase activity of the solution to be examined:

$$\frac{6.6}{t \cdot E_s} u/ml.$$

$t$=time in seconds
$E_s$=extinction of the calibrated sample, measured with respect to a blank value (1 cm., 436 m$\mu$).

EXAMPLE 4

(a) Agent for determining galactose oxidase on the basis of the hydrogen peroxide formed therefrom with galactose atmospheric oxygen Two solutions A and B( analogous to those of Example 3(a), are prepared; in place of the glucose solution, an equally strongly concentrated galactose solution is employed.

(b) Conducting the galactose oxidase determination

The determination is conducted analogously to that of Example 3(b). However, since commercially available galactose preparations exhibit a relatively low activity in many cases, 0.5 ml. of the galactose oxidase solution (content: approximately 0.1–1 u. galactose/ml.) to be measured is employed.

Analogously, D-amino acid oxidase, L-amino acid oxidase, and diamino oxidase preparations of unknown activity are determined in an aqueous solution by measuring the extinction and comparison with, respectively, one standard value. The amount of the enzyme is, in each case, diluted (when necessary) so that a sample contains about 0.05–5 unit of enzyme.

EXAMPLE 5

(a) Sprayable solution for the determination of galactose and galactose compounds in a paper and thin-layer chromatogram The sprayable solution contains a specific quantity of galactose oxidase. Hydrogen peroxide liberated from galactose or galactose compounds is detected by means of the solution. The thus-measured hydrogen peroxide is an indication of the content of galactose or galactose compounds in the samples to be analyzed.

SOLUTION A 40 mg. of sodium o-vanadate (containing about 50% $Na_3VO_4$ and about 50% water of crystallisation)
0.25 g. of potassium iodide
0.010 g. of galactose oxidase
5 ml. of phosphate buffer (ph=7.0)

SOLUTION B 7 mg. of dianisidine dihydrochloride
0.7 ml. of water (b) Conducting the determination The solutions A and B are combined. Immediately thereafter, a completely developed chromatogram of a mixture of carbohydrates, e.g. a glycoside hydrolysis mixture, is sprayed with this mixture. A few minutes after spraying, violet-gray to dark brown spots appear at the places on the chromatogram where galactose, galactose amines, and galactose-containing di- and oligosaccharides having a terminal-positioned galactose residue are present. The substances are identified on the basis of the $R_f$ values known for the individual substances. A roughly quantitative evaluation is effected by comparison with results obtained from standard solutions.

EXAMPLE 6

(a) Agent for the determination of galactose on the basis of the hydrogen peroxide formed therefrom with galactose oxidase/atmospheric oxygen

SOLUTION A 0.345 g. of $Na_2HPO_4 \cdot 2H_2O$
0.182 g. of $NaH_2PO_4 \cdot 2H_2O$
0.013 g. of galactose oxidase (7 u./ml.)
0.05 g. of KI
0.0012 g. of polyvinylpyrrolidone
0.025 g. of $NH_4VO_3$ are dissolved in 25 ml. of water. If desired, the pH is adjusted to 7.0.

SOLUTION B

This solution is produced from 0.0125 g. of dianisidine hydrochloride and 2.5 ml. of water.

An analytical solution (C) ready for use is obtained by mixing 10 ml. of solution A with 0.1 ml. of solution B.

(b) Conducting the analysis (b1) Deproteinization.—0.1 ml. of serum, plasma or whole blood is mixed and centrifuged with 1 ml. of a solution containing 0.16% of uranyl acetate and 0.9% NaCl.

Simultaneously, a sample of a standard solution (100 mg. of galactose in 100 ml. of water) is diluted with ten times the volume of water.

(b2) Color reaction.—0.2 ml. of deproteinized product obtained according to (b1) or of the standard sample pretreated in accordance with (b1) is mived with respectively 5 ml. ready-for-use analytical solution C. The mixture assumes a brown color. The mixture is allowed to stand for 30 minutes, and the extinctions with respect to the analytical solution C are measured by means of a photometer with a mercury-cadmium lamp at 436 m$\mu$.

(b3) Hydrogen peroxide or galactose content.—The hydrogen peroxide or galactose content is calculated according to the following formula:

Hydrogen Peroxide or Galactose Concentration=

$$E_A/E_S \cdot G$$

$E_A$=extinction of the analytical sample
$E_S$=extinction of the standard sample
G=hydrogen peroxide or galactose content, respectively, of the standard sample.

EXAMPLE 7

Agent for the determination of glucose on the basis of the hydrogen peroxide formed therefrom with glucose oxidase/atmospheric oxygen (a) Analogously to Example 6, the amount of hydrogen peroxide liberated from glucose by glucose oxidase in the presence of oxygen is determined as a measure for the glucose content in human or animal blood. For this purpose, a solution A is prepared as follows:

3.45 g. of $Na_2HPO_4 \cdot 2H_2O$
1.82 g. of $NaH_2PO_4 \cdot 2H_2O$
0.063 g. of glucose oxidase (15 u./ml.)
0.5 g. of KI, and
0.25 g. of $NH_4VO_3$ are dissolved in 250 ml. of water. The solution is adjusted to a pH of 7.0.

A solution B is prepared analogously to that of Example 6.

The analytical solution (C), which is ready for use, is obtained by mixing 100 ml. of solution A with 1 ml. of solution B.

The detection process is conducted as set forth in Example 6.

(b) 0.892 g. of $K_2HPO_4$
0.945 g. of $KH_2PO_4$
0.200 g. of tris(hydroxymethyl)aminomethane
0.040 g. of $NH_4VO_3$ or 0.05 g. of $Na_3VO_4 \cdot 10H_2O$
0.400 g. of KI
0.020 g. of glucose oxidase (25 u./ml.), and
0.015 g. of polyvinylpyrrolidone are dissolved in 100 ml. of water (solution A).

0.010 g. of dianisidine bis-dihydrogen phosphate is dissolved in 1 ml. of water (solution B).

For the preparation of the ready-for-use analytical solution, solution A is mixed with solution B.

The analysis with the above-described solution is conducted as set forth in Example 6.

(c) An analytical solution resulting in a readily soluble, red dyestuff (instead of the brown dyestuff) is produced in analogy to paragraph (b), but additionally 200 mg. of polyvinylpyrrolidone are introduced into Solution A.

The analysis is conducted as set out in Example 6, but with the difference that the extinctions are measured at 492 m$\mu$.

EXAMPLE 8

Sprayable solution for the detection of glucose

The sprayable solution contains a specific amount of glucose oxidase. By means of the solution, hydrogen peroxide liberated from glucose is detected. The thus-determined hydrogen peroxide represents a measure of the glucose contained in the sample.

500 mg. of sodium o-vanadate (consisting of about 50% $Na_3VO_4$ and 50% water of crystallization)
2.5 g. of potassium iodide
0.25 g. of glucose oxidase (30.000 u./g.) are dissolved in 50 ml. of 0.4 molar phosphate buffer (pH=7.4).

If desired, the solution is filtered. Before use, a solution of 7 mg. of o-dianisidine dihydrochloride in 1 ml. of water is added to this solution, and then the thus-formed analytical solution is shaken. By means of this solution, paper and thin-layer chromatograms are sprayed; in this connection, a large excess of analytical solution should be avoided since this would wash out the spots. The stains (violet-gray; at higher concentration dark brown) evolve in the presence of glucose (3$\gamma$/stain) immediately and are evaluated roughly quantitatively after 2 to 3 minutes.

EXAMPLE 9

Sprayable solution for the detection of D-and L-amino acids in paper and thin-layer chromatograms The sprayable solution contains an excess of D-amino acid oxidase and makes it possible to detect, specifically, D-amino acids, in addition to the corresponding L-amino acids on paper and thin-layer chromatograms.

40 mg. of $Na_3VO_4 \cdot 10 H_2O$ and
250 mg. of KI are dissolved in
5 ml of 0.2 molar phosphate buffer (pH=7.8).

Immediately before spraying the chromatograms, the following compounds are added:

0.5 ml. of D-amino acid oxidase suspension (75 u/ml.) (from pig kidneys), and a solution of 7 mg. of dianisidine bis-dihydrogen phosphate in 0.5 ml. of water.

The chromatograms of amino acid mixtures are sprayed with this solution. After a few minutes, dark strains appear on those places where D-amino acids are present (for example, 100 $\gamma$ D-alanine per stain). (In this connection L-amino acids do not yield any coloring.)

If, in place of D-amino acid oxidase, the L-amino acid oxidase is employed, the reagent serves for the detection of L-amino acids.

EXAMPLE 10

Agent for the detection of D-amino acids

The agent contains an excess of D-amino acid oxidase and makes it possible to determine quantitatively small amounts of D-amino acids in addition to the corresponding L-amino acids in solutions.

(a) Preparation of the analytical solution 5 mg. of $Na_3VO_4 \cdot 10\ H_2O$ and 40 mg. of KI are dissolved in 5 ml. of 0.1 molar phosphate buffer (pH=7.8).

Into this solution, there are introduced 0.05 ml. of a 0.5% dianisidine hydrochloride solution, 0.05 ml. of a 1% polyvinylpyrrolidone solution, and 0.05 ml. of a D-amino acid oxidase solution (70 u/ml.).

(b) Conducting the determination 0.02 ml. of the deproteinized solution, the D-amino acid content of which amounts to about 0.005–0.2% (or which solution is diluted to this concentration) and is to be determined more specifically, is mixed with 1 ml. of the analytical solution. The mixture is allowed to stand for 40 minutes at room temperature, and the extinction is measured at 436 m$\mu$ with respect to a blank value. The content of D-amino acid is obtained by comparison with the analytical result of a standard sample.

EXAMPLE 11

Agent for the determination of D-amino acid oxidase

The agent contains an excess of D-alanine and serves for the determination of D-amino acid oxidase.

0.2 g. of D-alanine
40.0 mg. of KI and 10.0 mg. of $Na_3VO_4 \cdot 10\ H_2O$ are dissolved in
10.0 ml. of pH 8—phosphate buffer The solution is saturated with oxygen at room temperature.

Of this solution, 3 ml. are introduced into the measuring cuvette of a photometer (436 m$\mu$), 0.03 ml. of 1% dianisidine phosphate solution and 0.03 ml. of a 1% polyvinylpyrrolidone solution are added, and the sample solution to be measured (0.05 ml. content about 1–10 u./ml.) is added thereto. After each minute, the extinction is measured at 25° C., and from the velocity of the variation of extinction the D-amino acid oxidase concentration is calculated:

(15) $\left(\dfrac{\mu\ mol}{min.} per\ ml.\right)$

In order to convert the extinctions into $\mu$mol of D-amino acids, a factor is determined with the analytical solution and the procedure of Example 10, with the aid of a calibrating solution.

EXAMPLE 12

Agent for the determination of galactose 0.892 g. of $K_2HPO_4$
0.945 g. of $KH_2PO_4$
0.400 g. of KI
0.020 g. of galactose oxidase, and
0.015 g. of polyvinylpyrrolidone are dissolved in 25 ml. of water.

The solution is adjusted to a pH of 7.0 by the addition of potassium hydroxide solution, and there are added 0.05 g. of $Na_3VO_4$ and a solution of
10 mg. of dianisidine bis-dihydrogen phosphate in 1 ml. of water.

Thereafter, the solution is divided into 2.5 ml. batches and freeze-dried.

The reagent, ready for use, is obtained by dissolving the residue in 10 ml. of water. The reagent is employed in the same manner as the analytical solution C in Example 6.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a color forming test composition for detecting hydrogen peroxide or substances yielding hydrogen peroxide, comprising in admixture and as essential ingredients, a redox catalyst and a water-soluble iodide, the improvement wherein the redox catalyst is a water-soluble vanadate.

2. A composition according to claim 1 wherein the vanadate is essentially monomeric to tetrametric vanadate.

3. A composition according to claim 2 wherein the vanadate is an o- or m-vanadate selected from the group consisting of sodium vanadate, potassium vanadate and ammonium vanadate.

4. A composition according to claim 3 wherein the vanadate is $NH_4VO_3$.

5. A composition according to claim 3 wherein the vanadate is $Na_3VO_4$ hydrate.

6. A composition according to claim 1 wherein the iodide is an alkali iodide selected from the group consisting of sodium iodide, potassium iodide and ammonium iodide.

7. A composition according to claim 1 further containing a buffer for maintaining an aqueous solution within a pH range of from 4.5 to 9.5.

8. A composition according to claim 1 further containing a chromogen oxidizable in aqueous solution to a colored compound by a member selected from the group consisting of hydrogen peroxide and iodine.

9. A composition according to claim 8 wherein the chromogen is selected from the group consisting of o-dianisidine, o-tolidine, and the acid addition salts of these compounds.

10. A composition according to claim 1 further containing a natural or synthetic inert, polymeric water-soluble protective colloid having a gold number less than on the order of 0.25.

11. A composite according to claim 10 wherein the protective colloid is a member selected from the group consisting of polyvinylpyrrolidone, polyethylene glycol, polyvinyl alcohol and gelatin.

12. A composition according to claim 1 further containing a buffer for maintaining an aqueous solution within a pH range of from 4.5 to 9.5, a chromogen oxidizable in aqueous solution to a colored compound by a member selected from the group consisting of hydrogen peroxide and iodine and a natural or synthetic inert, water-soluble protective colloid.

13. A composition according to claim 1, further comprising glucose oxidase.

14. A composition according to claim 1, further comprising galactose oxidase.

15. A composition according to claim 12 in solid form which, on solution in a suitable volume of water, yields an aqueous composition of the following components in the indicated concentrations:

water-soluble vanadate—0.0005–0.1 g. mol./l.
water-soluble iodide—0.006–0.3 g. mol./l.
buffer, resulting in a pH of from 4.5–9.5—0.002–0.8 g. mol/l.

tris(hydroxymethyl)aminomethane—0–0.5 g. mol/l.
chromogen—0.01–1 g. mmol/l.
glucose oxidase (5–50 u./mg.)—0.01–10 g./l.
polyvinylpyrrolidone—0.02–1 g./l.

16. A detection kit for detecting hydrogen peroxide or substances yielding hydrogen peroxide, said kit being in powder form and in two parts in the following approximate composition:

part 1:
    0.892 part by weight of $K_2HPO_4$
    0.945 part by weight of $KH_2PO_4$
    0.200 part by weight of tris(hydroxymethyl) aminomethane
    0.040 part by weight of sodium o-vanadate hydrate
    0.400 part by weight of potassium iodide
    0.020 part by weight of glucose oxidase
    0.015 part by weight of polyvinylpyrrolidone
part 2: 0.010 part by weight of dianisidine bis-dihydrogen phosphate.

17. In the process of colorimetrically determining either the hydrogen peroxide content or the content of a substance yielding hydrogen peroxide in a sample, said process including the step of reacting the sample with an agent comprising a redox catalyst and a water-soluble iodide, the improvement wherein the redox catalyst is a water-soluble vanadate.

18. An aqueous composition for detecting hydrogen peroxide or substances yielding hydrogen peroxide, said composition comprising in g. moles/liter:

| | |
|---|---|
| (a) water-soluble vanadate | 0.0003–0.2 |
| (b) water-soluble iodide | 0.006–1 |
| (c) buffer for maintaining a pH of the aqueous solution of 4.5–9.5 | 0–0.8 |
| (d) chromogen oxidizable in aqueous solution to a colored compound by hydrogen peroxide or iodine | 0–0.0005 |
| (e) inert, polymeric, water-soluble protective colloid having a gold number less than about on the order of 0.25 | 0–0.15 |

19. A composition as defined by claim 18 wherein the values of g. moles/liter are:

| | |
|---|---|
| (a) | 0.001–0.1 |
| (b) | 0.01–0.1 |
| (c) | 0.05–0.2 |
| (d) | 0.00008–0.0015 |
| (e) | 0.002–0.1 |

References Cited

UNITED STATES PATENTS

| | | | |
|---|---|---|---|
| 3,066,081 | 11/1962 | Lewis | 195—103.5 |
| 3,183,173 | 5/1965 | Oakes | 195—103.5 |
| 3,404,069 | 10/1968 | Ware | 195—103.5 |

OTHER REFERENCES

"Hydrogen Peroxide," by Walter C. Schumb, Reinhold Publishing Corporation, New York, N.Y., 1955, Chapman & Hall, Ltd., London, pp. 497, 498.

"Oxidation Mechanism," by Ross Stewart, W. A. Benjamin, Inc., 1964, New York, Amsterdam, pp. 77–80.

JOHN T. GOOLKASIAN, Primary Examiner

L. T. KENDELL, Assistant Examiner

U.S. Cl. X.R.

252—408, 461; 424—7, 94